(12) United States Patent
Arai et al.

(10) Patent No.: US 6,243,656 B1
(45) Date of Patent: Jun. 5, 2001

(54) COOLING MODE SWITCHING SYSTEM FOR CPU

(75) Inventors: Makoto Arai; Hiroyuki Oda; Hironori Ito, all of Tokyo (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/320,788

(22) Filed: May 27, 1999

Related U.S. Application Data

(63) Continuation of application No. 08/654,332, filed on May 28, 1996, now Pat. No. 6,014,611.

(30) Foreign Application Priority Data

May 30, 1995 (JP) .................................................... 7-132194

(51) Int. Cl.$^7$ ............................ G01K 13/00; G05D 23/00
(52) U.S. Cl. ........................... 702/132; 713/300; 713/320
(58) Field of Search .............................. 702/132; 713/300, 713/320, 322, 323, 324, 340

(56) References Cited

U.S. PATENT DOCUMENTS

| | | | |
|---|---|---|---|
| 4,734,871 | 3/1988 | Tsunoda et al. | 364/557 |
| 4,756,473 | 7/1988 | Takemae et al. | 236/49 |
| 4,787,032 | 11/1988 | Culley | 364/200 |
| 4,851,987 | 7/1989 | Day | 364/200 |
| 4,980,836 | 12/1990 | Carter et al. | 364/483 |
| 4,980,850 | 12/1990 | Morgan | 364/990 |
| 5,012,408 | 4/1991 | Conroy | 364/200 |
| 5,040,153 | 8/1991 | Fung et al. | 365/230.03 |
| 5,056,009 | 10/1991 | Mizuta | 364/200 |
| 5,115,225 | 5/1992 | Dao et al. | 340/584 |

(List continued on next page.)

FOREIGN PATENT DOCUMENTS

| | | | |
|---|---|---|---|
| 0683558 A1 | 11/1995 | (EP) | H02H/5/04 |
| 63-100522 | 5/1988 | (JP) . | |
| 2-299009 | 12/1990 | (JP) | G06F/1/20 |
| 5-11897 | 1/1991 | (JP) . | |
| 3-116210 | 5/1991 | (JP) . | |
| 4-55624 | 5/1992 | (JP) . | |
| 7-28561 | 1/1995 | (JP) . | |
| 7-44408 | 2/1995 | (JP) . | |

OTHER PUBLICATIONS

SL Enhanced Intel 486TM Microprocessor Family (Intel Corporation) 1993.
"Peripheral Components" by Intel (1995).
U.S. application No. 08/654,875; filed May 29, 1996; and its file history.
Notice for Japanese patent application No. 7–132194 from Japanese Patent Office with English translation.

*Primary Examiner*—Patrick Assouad
(74) *Attorney, Agent, or Firm*—Gray Cary Ware & Freidenrich LLP

(57) ABSTRACT

Two cooling functions are provided: one being reduction in operation speed of a CPU, and the other being rotation of a motor fan. The two cooling functions are selectively used in accordance with a cooling mode set by a user. When a "Quiet" mode is selected by the user, a mode giving a priority to low power consumption is set to make the battery operation time as long as possible. In this case, the motor fan is not rotated and only the CPU operation speed is lowered. On the other hand, when a "Performance" mode is selected by the user, a mode giving a priority to performance is set. In this case, the CPU operation speed is not lowered, and only the motor fan is rotated. The "Performance" mode and "Quiet" mode can be freely set by the user on a setup screen.

31 Claims, 10 Drawing Sheets

U.S. PATENT DOCUMENTS

| | | | |
|---|---|---|---|
| 5,125,088 | 6/1992 | Culley | 395/500 |
| 5,129,069 | 7/1992 | Helm et al. | 395/400 |
| 5,189,314 | 2/1993 | Georgiou et al. | 307/271 |
| 5,230,055 | 7/1993 | Katz et al. | 395/750 |
| 5,269,010 | 12/1993 | Macdonald | 395/425 |
| 5,287,292 | 2/1994 | Kenny et al. | 364/550 |
| 5,291,607 | 3/1994 | Ristic et al. | 395/750 |
| 5,359,719 | 10/1994 | Chang et al. | 395/400 |
| 5,369,771 | 11/1994 | Gettel | 395/750 |
| 5,392,437 | 2/1995 | Matter et al. | 395/750 |
| 5,418,751 | 5/1995 | Kaiser | 365/211 |
| 5,422,806 | 6/1995 | Chen et al. | 364/149 |
| 5,422,832 | 6/1995 | Moyal | 364/557 |
| 5,451,892 | 9/1995 | Bailey | 327/113 |
| 5,473,767 | 12/1995 | Kardach et al. | 395/550 |
| 5,481,210 | 1/1996 | Genzel | 326/93 |
| 5,483,102 | 1/1996 | Neal et al. | 257/712 |
| 5,484,012 | 1/1996 | Hiratsuka | 165/40 |
| 5,485,127 | 1/1996 | Bertoluzzi et al. | 331/69 |
| 5,490,059 * | 2/1996 | Mahalingaiah et al. | 364/166 |
| 5,504,908 | 4/1996 | Ikeda | 395/750 |
| 5,513,331 | 4/1996 | Paulowski et al. | 395/401 |
| 5,513,361 | 4/1996 | Young | 395/750 |
| 5,522,062 | 5/1996 | Yamaki | 395/497.03 |
| 5,526,239 | 6/1996 | Dinh et al. | 364/557 |
| 5,526,289 | 6/1996 | Dinh et al. | 364/557 |
| 5,535,368 | 7/1996 | Ho et al. | 395/497.01 |
| 5,546,568 | 8/1996 | Bland et al. | 395/550 |
| 5,557,550 | 9/1996 | Vigil et al. | 364/557 |
| 5,560,001 | 9/1996 | Kardach et al. | 395/550 |
| 5,560,002 | 9/1996 | Kardach et al. | 395/550 |
| 5,572,692 | 11/1996 | Murdoch et al. | 395/405 |
| 5,574,667 | 11/1996 | Dinh et al. | 364/557 |
| 5,590,342 | 12/1996 | Marisetty | 395/750 |
| 5,631,852 | 5/1997 | Chen | 364/557 |
| 5,706,407 * | 1/1998 | Nakamura et al. | 395/86 |
| 5,721,837 | 2/1998 | Kikinis et al. | 395/281 |
| 5,752,011 | 5/1998 | Thomas et al. | 395/556 |
| 5,777,897 * | 7/1998 | Giorgio | 364/557 |
| 5,798,918 | 8/1998 | Georgiou et al. | 364/148 |
| 5,926,386 * | 7/1999 | Ott et al. | 364/175 |
| 5,974,557 * | 10/1999 | Thomas et al. | 713/322 |
| 6,014,611 * | 1/2000 | Arai et al. | 702/132 |
| 6,029,119 * | 2/2000 | Atkinson | 702/132 |
| 6,047,248 * | 4/2000 | Georgiou et al. | 702/132 |

\* cited by examiner

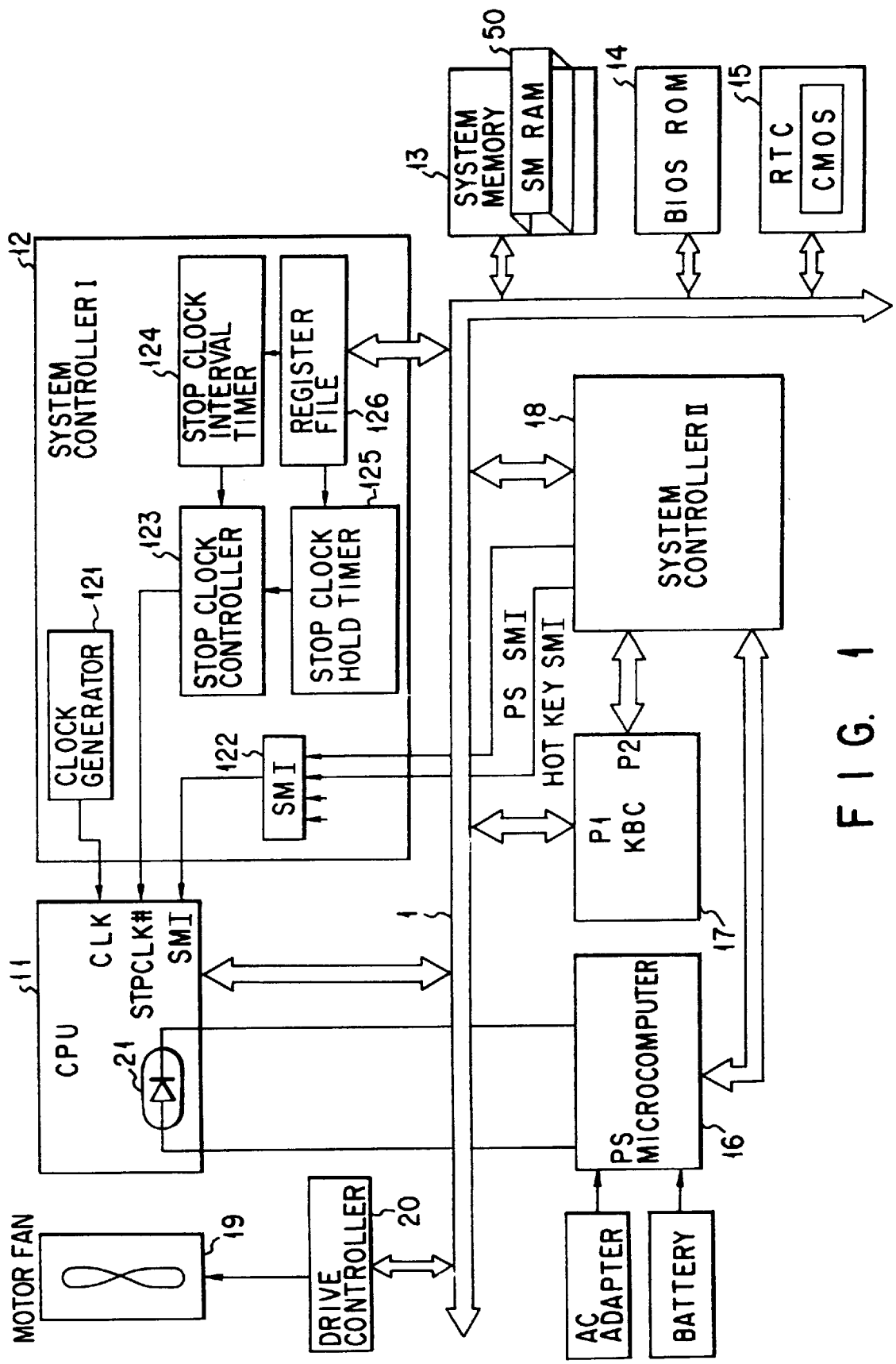
F I G. 1

| BATTER SAVE MODE | FULL POWER | LOW POWER | USER SETTING |
|---|---|---|---|
| COOLING METHOD | PERFORMANCE (MOTOR FAN) | QUIET (CPU CLOCK) | PERFORMANCE/QUIET |

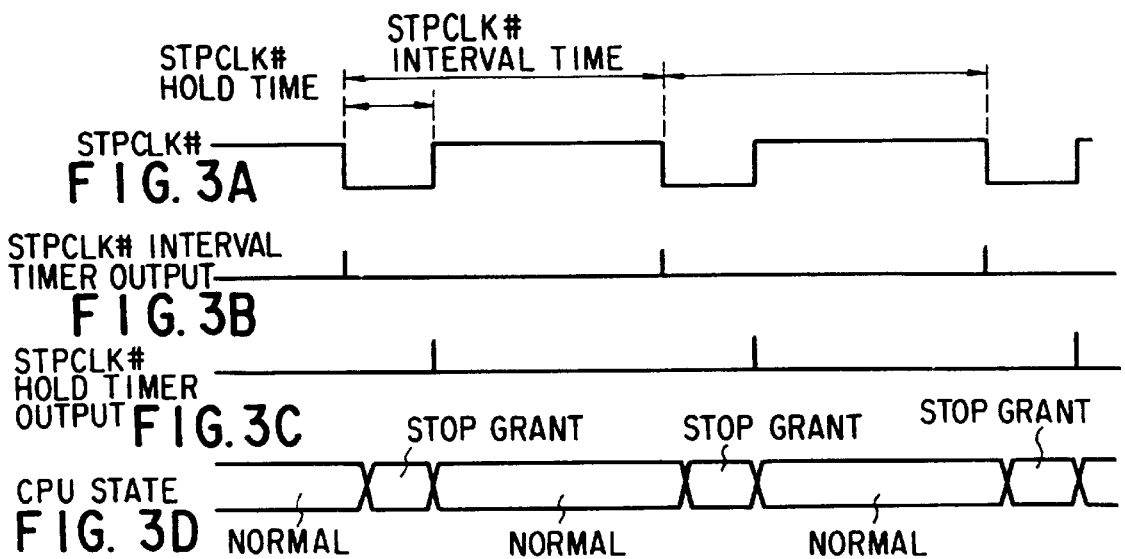
FIG. 3A
FIG. 3B
FIG. 3C
FIG. 3D
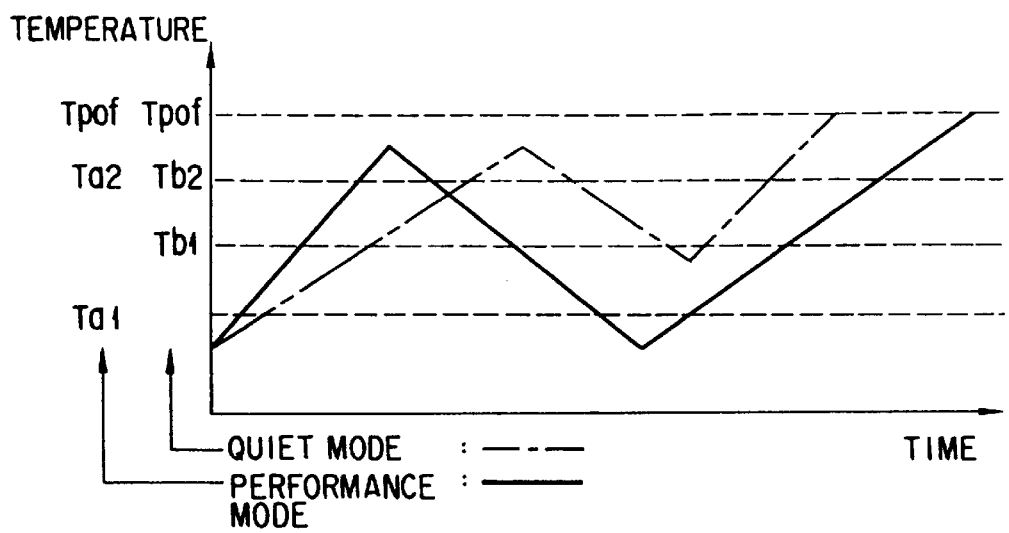
Tpof: TEMPERATURE AT WHICH FORCIBLE SUSPEND REQUEST IS ISSUED
Tb2: TEMPERATURE AT WHICH CPU-OPERATION-SPEED-DECREASING REQUEST IS ISSUED
Tb1: TEMPERATURE AT WHICH CPU-OPERATION-SPEED-INCREASING REQUEST IS ISSUED
Ta2: TEMPERATURE AT WHICH RADIATOR-FAN-ON REQUEST IS ISSUED
Ta1: TEMPERATURE AT WHICH RADIATOR-FAN-OFF REQUEST IS ISSUED
FIG. 7

―― SETUP ――

―― MEMORY ――
Total           =8192KB
Base            = 640KB
Extended        =7360KB
Shadow BIOS ROM = 192KB ―― DISPLAY ――
Display Adaptor    =VGA Compatible
LCD Display Mode   =Color
LCD Display Colors =16M Colors
Power On Display   =Internal/External
Text Mode Stretch  =Enabled ―― HARD DISK ――
HDD Mode =Enhanced IDE (Normal)

―― I/O PORT ――
Serial Port   =COM1 (IRQ4/3F8H)
Parallel Port =LPT1 (378H)
Sound System  =Address/IRQ/DMA ―― PASSWORD ――
Not Registered ―― OTHERS ――
Power-up Mode     =Boot
CPU Cache         =Enabled
Battery Save Mode =Full Power
Alarm Volume      =High
System Beep       =Enabled Alarm Power On    =Disabled
Keyboard          =Layout/Fn
Pointing Devices  =Auto-Selected
Boot Priority     =FDD→HDD

FIG. 4

```
        ┌── OTHERS ──────────────────────────────────┐
        │  Power-up Mode              =Boot          │
        │  CPU Cache                  =Enabled       │
FULL    │  Battery Save Mode          =Full Power    │
POWER   │  Ala  ┌── BATTERY SAVE OPTIONS ──────────┐ │
        │  Sys  │  Processing Speed    =High       │ │
        │       │  CPU Sleep Mode      =Disabled   │ │
        │  Ala  │  Display Auto Off    =30Min.     │ │
        │  Key  │  HDD Auto Off        =Disabled   │ │
        │  Poi  │                                  │ │
        │  Boo  │  LCD Brightness      =Bright     │ │
        │       │  Cooling Method      =Performance│ │
```

FIG. 5A

```
        ┌── OTHERS ──────────────────────────────────┐
        │  Power-up Mode              =Boot          │
        │  CPU Cache                  =Enabled       │
        │  Battery Save Mode          =Low Power     │
        │  Ala  ┌── BATTERY SAVE OPTIONS ──────────┐ │
LOW     │  Sys  │  Processing Speed    =Low        │ │
POWER   │       │  CPU Sleep Mode      =Enabled    │ │
        │  Ala  │  Display Auto Off    =30Min.     │ │
        │  Key  │  HDD Auto Off        =Enabled    │ │
        │  Poi  │                                  │ │
        │  Boo  │  LCD Brightness      =Bright     │ │
        │       │  Cooling Method      =Quiet      │ │
```

FIG. 5B

```
        ┌── OTHERS ──────────────────────────────────┐
        │  Power-up Mode              =Boot          │
        │  CPU Cache                  =Enabled       │
        │  Battery Save Mode          =User Settiong │
        │  Ala  ┌── BATTERY SAVE OPTIONS ──────────┐ │
USER    │  Sys  │  Processing Speed    =           │ │
SETTING │       │  CPU Sleep Mode      =           │ │
        │  Ala  │  Display Auto Off    =           │ │
        │  Key  │  HDD Auto Off        =           │ │
        │  Poi  │                                  │ │
        │  Boo  │  LCD Brightness      =           │ │
        │       │  Cooling Method      =           │ │
```

FIG. 5C

| CPU OPERATION RATE | REGISTER VALUES | |
|---|---|---|
| (%) | STOP CLOCK INTERVAL TIMER | STOP CLOCK HOLD TIMER |
| 100 | Disabled | 0µs |
| 90 | 64µs | 6µs |
| 80 | 64µs | 13µs |
| 70 | 64µs | 19µs |
| 60 | 64µs | 26µs |
| 50 | 64µs | 32µs |

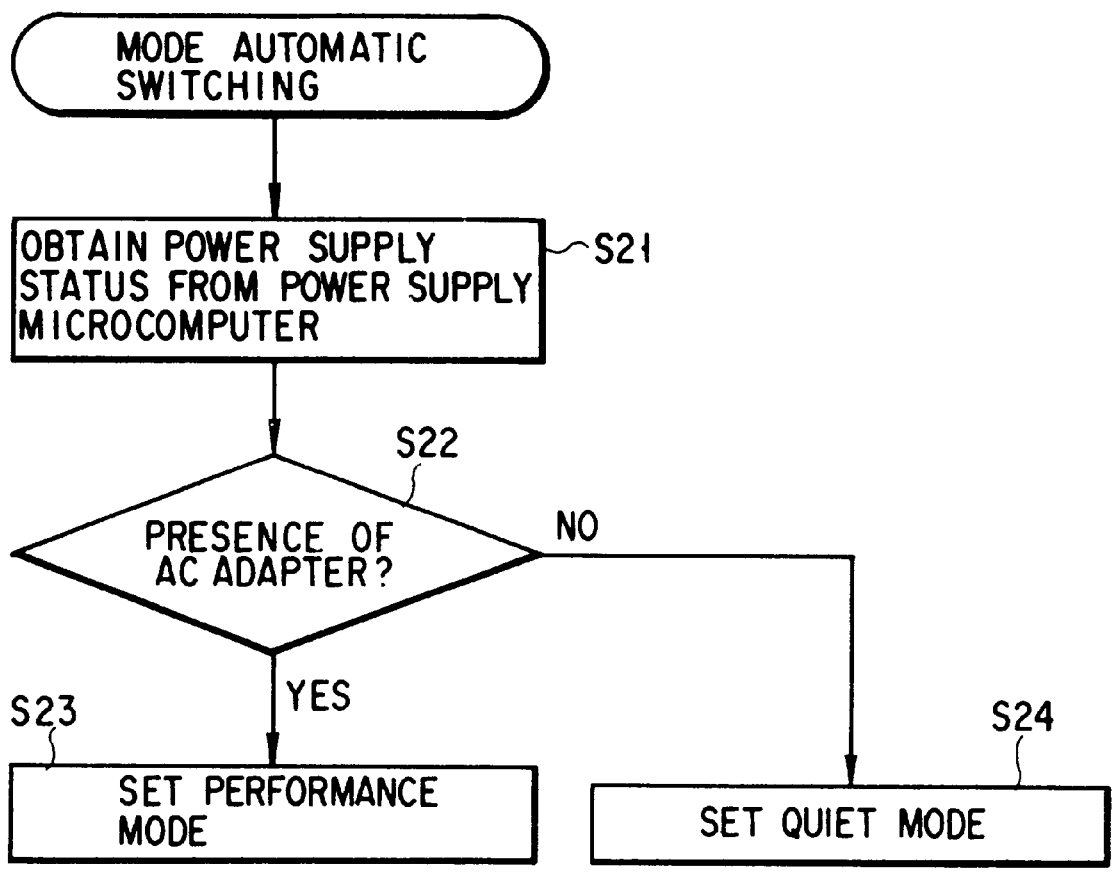
F I G. 13

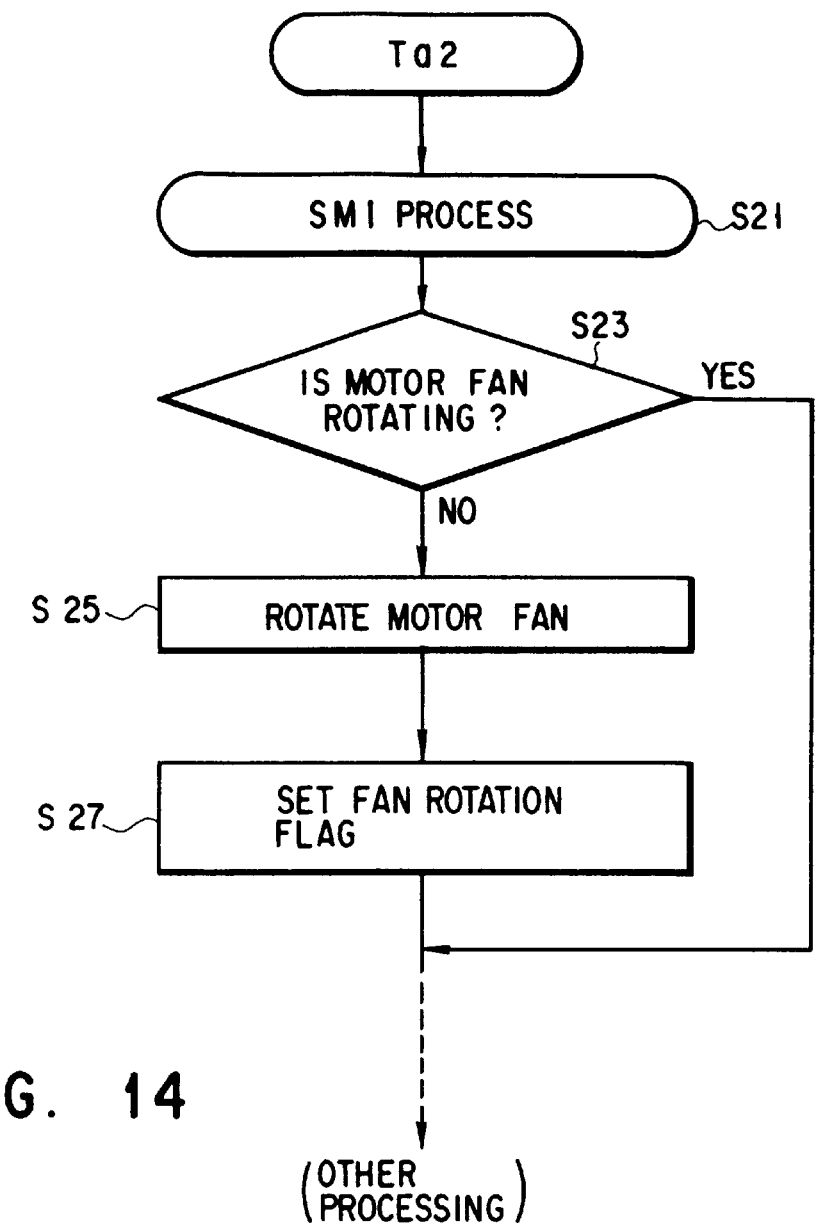
F I G. 14
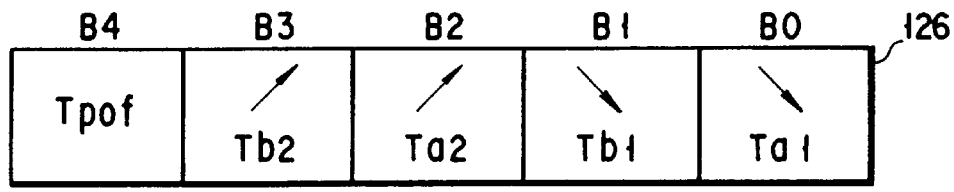
F I G. 15

COOLING MODE SWITCHING SYSTEM FOR CPU

This is a continuation of U.S. application Ser. No. 08/654,332 filed May 28, 1996 now U.S. Pat. No. 6,014,611.

BACKGROUND OF THE INVENTION

1. Field of the Invention

The present invention relates generally to a computer having a function for preventing overheat of a CPU.

2. Description of the Related Art

Recently, various kinds of battery-powered, lap-top type or notebook type portable personal computers have been developed. In these portable computers, the performance of CPUs has been enhanced, and thereby the users can easily obtain a comfortable environment for use.

However, the amount of heat produced by the CPU increases as the performance thereof becomes higher, and the heat causes various troubles and problems. Specifically, the heat of the CPU raises the temperature of the inside of the computer up to a level exceeding the operation guaranteed temperature of other parts, or the CPU malfunctions due to its own heat.

To solve these problems, some methods have been adopted. For example, the temperature of the CPU itself is monitored and if the amount of heat produced by the CPU is too great, the operation speed of the CPU is lowered or the CPU is cooled by a motor fan.

If the operation speed of the CPU is lowered, however, the performance of the computer is automatically degraded, irrespective of the user's intention, and the environment of use deteriorates. On the other hand, if the motor fan is driven to cool the CPU, a relatively high power is consumed by the motor fan and the battery operation time of the portable computer is shortened.

SUMMARY OF THE INVENTION

The object of the present invention is to provide a computer wherein an optimal cooling function can be selected according to the environment of use of a computer and overheat of a CPU is efficiently prevented without degrading the environment of use of the computer.

According to the present invention, there is provided a computer comprising: a CPU; a temperature sensor for sensing the temperature of the CPU; CPU speed control means for controlling the operation speed of the CPU; a motor fan for cooling the CPU; setup means for setting an operational environment of said computer, said setup means being capable of selectively setting a first cooling mode for lowering the operation speed of the CPU and a second cooling mode for rotating said motor fan; and CPU cooling control means, controlled by a temperature detection signal from said temperature sensor, for cooling the CPU by using one of the motor fan and the CPU speed control means in accordance with the cooling mode set by said setup means.

In this computer, two cooling functions are provided: one being reduction in operation speed of a CPU, and the other being rotation of a motor fan. The two cooling functions are selectively used in accordance with a cooling mode set by a user. When a first mode is selected by the user, a mode giving a priority to low power consumption is set to make the battery operation time as long as possible. In this case, the motor fan is not rotated and only the CPU operation speed is lowered. On the other hand, when a second mode is selected by the user, a mode giving a priority to performance is set. In this case, the CPU operation speed is not lowered, and only the motor fan is rotated.

Thus, an optimal cooling function can be selected according to an operational environment of the computer set by the user, and overheat of a CPU is efficiently prevented without degrading the present environment of use of the computer.

In this case, it is preferable that a second temperature in the second cooling mode wherein the motor fan is rotated, at which the cooling operation is stopped, be set at a lower level than a second temperature in the first cooling mode wherein the CPU operation speed is lowered, at which the cooling operation is stopped.

The reason for this is that with use of the motor fan, the CPU temperature is lowered in a relatively short time period. Accordingly, if the second temperature is set at a higher level, the time period between the start of rotation of the motor fan and the stop of rotation thereof is shorter and the time period between the stop of rotation of the motor fan and the restart of rotation thereof due to the next overheat of the CPU is also shorter. Consequently, the cycle of alternate rotation and stop of the motor fan becomes shorter and unpleasant noise will be produced by the motor fan. Besides, since the motor fan is situated such that its air passage faces the CPU, the CPU temperature is lowered in a relatively short time period, although the decrease in temperature of other parts is delayed. Thus, it is preferable to set at a lower level the second temperature in the second cooling mode in which the motor fan is rotated.

On the other hand, in the first cooling mode in which the CPU operation speed is lowered, a relatively long time period is needed until the CPU temperature falls to the second temperature. The longer this time period, the lower the computer performance. It is thus preferable to set the second temperature as high as possible in the first cooling mode in which the CPU operation speed is lowered.

As has been described above, the optimal environment of use can be realized by independently setting the second temperatures in consideration of the characteristics of the two cooling functions: the rotation of the motor fan and the reduction in CPU operation speed. Specifically, the second temperature in the second cooling mode wherein the motor fan is rotated, at which the cooling operation is stopped, is set at a lower level than a second temperature in the first cooling mode wherein the CPU operation speed is lowered, at which the cooling operation is stopped.

BRIEF DESCRIPTION OF THE DRAWINGS

FIG. 1 is a block diagram showing the structure of a computer system according to an embodiment of the present invention;

FIGS. 3A through 3D illustrate CPU performance control operations adopted in the system of the present embodiment, FIG. 3A showing a signal waveform of STPCLK#, FIG. 3B showing a signal waveform of a stop clock interval timer output, FIG. 3C showing a signal waveform of a stop clock hold timer output, and FIG. 3D showing a signal waveform of a CPU state;

FIG. 4 shows an example of a setup screen used in the system of the embodiment;

FIGS. 5A through 5C illustrate the contents of battery save options displayed in windows on the setup screen of FIG. 4;

FIG. 7 is a graph showing a variation in temperature for explaining the CPU cooling operation in the two cooling modes in the system of the embodiment;

FIG. 13 is a flowchart for illustrating the operation of an IRT routine prepared in the system of the embodiment;

FIG. 14 is a flowchart illustrating a process carried out when an SMI is generated at Ta2; and FIG. 15 shows bit assignment in a register in which various commands from a power supply controller are set.

DETAILED DESCRIPTION OF THE PREFERRED EMBODIMENTS

Figures 2, 6:
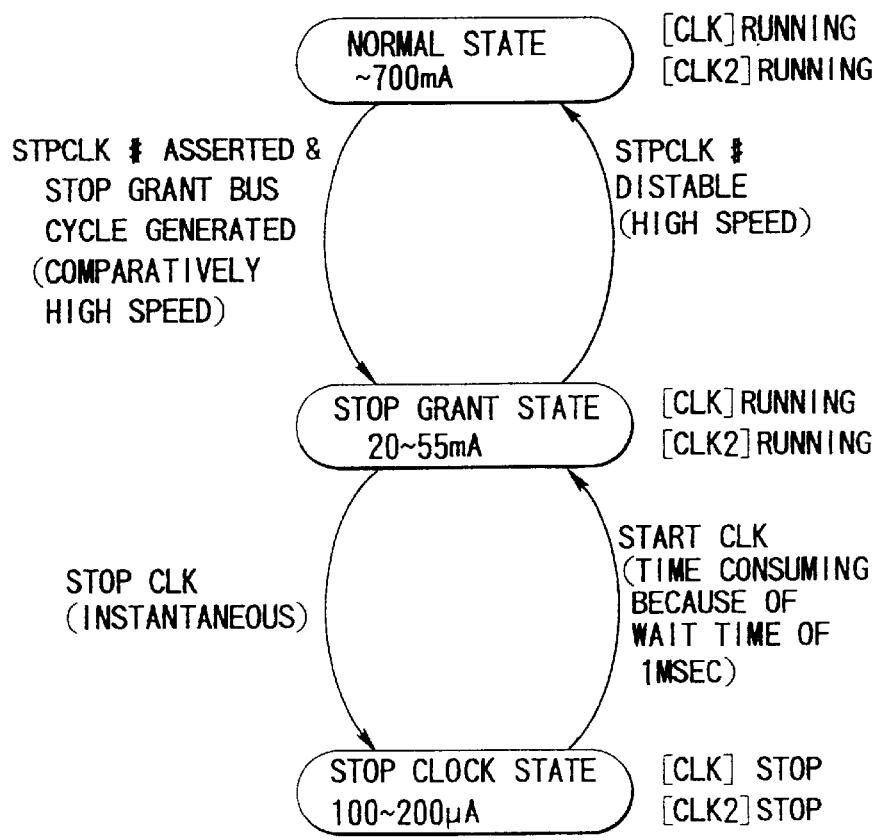
FIG. 2 illustrates three operation states of a CPU, provided in the computer system of the embodiment.
FIG. 6 illustrates the correspondency between three battery save modes and two cooling modes prepared for the system of this embodiment.

An embodiment of the present invention will now be described with reference to the accompanying drawings.

FIG. 1 shows the structure of a computer system according to an embodiment of the present invention. The computer system is a portable personal computer system of a lap-top type or a notebook type. The computer system comprises a CPU 11, a system controller I 12, a system memory 13, a BIOS ROM 14, a real-time clock (RTC) 15, a power supply (PS) microcomputer 16, a keyboard controller 17, a system controller II 18, a motor fan 19, a fan drive controller 20, and a temperature sensor 21.

The CPU 11 comprises, for example, a micro-processor SL Enhanced Intel486 or Pentium manufactured and marketed by U.S. Intel Corp. The CPU 11 includes a PLL circuit which generates, on the basis of an external clock CLK, an internal clock CLK2 having a speed equal to or higher than the external clock CLK. The CPU 11, as shown in FIG. 2, has three operation states with different power consumptions: Normal State, Stop Grant State and Stop Clock State.

The Normal State is a normal operation state of the CPU 11, and commands are executed in the Normal State. Power consumption is highest in the Normal State. The consumption current in the Normal State is up to about 700 mA.

Power consumption is lowest in the Stop Clock State. The consumption current in this state is about 100 to 200 µA. In the Stop Clock State, not only the execution of commands is stopped, but also the external clock CLK and internal clock CLK2 are stopped.

The Stop Grant State is an intermediate state between the Normal State and Stop Clock State. The consumption current in the Stop Grant State is about 20 to 55 mA and relatively low. In the Stop Grant State, commands are not executed. Although both the external clock CLK and internal clock CLK2 are in the running state, the supply of the internal clock CLK2 to a CPU internal logic (CPU core) is prohibited. In the Stop Grant State, the external clock CLK can be stopped. If the external clock CLK is stopped in the Stop Grant State, the CPU 11 exits from the Stop Grant State and enters the Stop Clock State.

The shift between the Normal State and Stop Grant State can be quickly effected by a stop clock (STPCLK#) signal.

Specifically, if the STPCLK# signal supplied to the CPU 11 in the Normal State is set in the enable state, i.e. active state, the CPU 11, after the currently executed command is finished, does not execute the next command and makes empty the internal pipeline. Then, the CPU 11 carries out a stop grant cycle and shifts from the Normal State to the Stop Grant State. On the other hand, if the STPCLK# signal is set in the disable state, i.e. inactive state in the Stop Grant State, the CPU 11 shifts from the Stop Grant State to the Normal State and resumes the execution of the next command.

The shift from the Stop Grant State to the Stop Clock state is instantaneously effected by stopping the external clock CLK. If the supply of the external clock CLK to the CPU 11 is resumed in the Stop Clock State, the CPU 11 enters the Stop Grant State after 1 ms. When the CPU 11 goes back from the Stop Clock State, a certain time period is needed.

As has been described above, the power consumption in the Stop Grant State is much lower than that in the Normal State, and the Stop Grant State can be quickly restored to the Normal State, i.e. command execution state, by the STPCLK# signal. Thus, the present system adopts the Stop Grant State as a function for lowering the CPU operation speed.

The CPU 11 shown in FIG. 1 has system management functions described below.

Specifically, the CPU 11 has a real mode for executing programs such as an application program and an OS, a protect mode and a virtual 86 mode, as well as an operation mode called SMM (System Management Mode) for executing a system management program exclusively used for system management or power management.

In the real mode, a memory space of 1 Mbyte at maximum can be accessed. A physical address is determined by an offset value from a base address represented by a segment register. In the protect mode, a memory space of 4 G Byte at maximum per task can be accessed and a linear address is determined by using an address mapping table called "descriptor table". The linear address is converted at last to a physical address by paging. The virtual 86 mode is a mode for enabling a program designed for the real mode to be executed in the protect mode. In the virtual 86 mode, a real-mode program is treated as one task in the protect mode.

The system management mode (SMM) is a quasi-real mode. In this mode, the descriptor table is not referred to, nor is the paging performed. When a system management interrupt (SMI) is generated in the CPU 11, the operation mode of the CPU 11 is switched to the SMM from the real mode, protect mode or virtual 86 mode. In the SMM, a system management program exclusive for system management or power save control is executed.

The SMI is a kind of a non-maskable interrupt (NMI). The SMI is an interrupt with a top priority and has a preference to a normal NMI or a mask enable interrupt INTR. By issuing the SMI, various SMI service routines prepared as system management programs can be run, independently of a currently run application program or the OS environment. In the present computer system, this SMI is used to control the CPU operation speed and the rotation of the motor fan 19, thereby to cool the CPU 11 independently of the OS environment.

The system controller I 12 is a gate array for controlling memories and I/O within the system. Hardware for controlling generation of an SMI signal and STPCLK# signal to the CPU 11 is built in the system controller I 12.

The system memory 13 stores an operating system, an application program to be processed, user data prepared by the application program, etc. A system management (SM) RAM 50 is an overlay memory mapped in an address space between address 30000H and 3FFFFH in the main memory 13. The SM RAM 50 is accessible only when the SMI signal is input to the CPU 11. The address range in which the SM RAM 50 is mapped is not fixed and can be changed to a given position in a 4-Gbyte space by a register called SMBASE. The SMBASE register is accessible only in the SMM. The initial value of the SMBASE register is address 3000H.

When the CPU 11 enters the SMM, the CPU status, i.e. the register data, etc. of the CPU 11 at the time the SMI has been generated, are saved in the SM RAM 50 in a stacked manner. The SM RAM 50 stores a command for accessing a system management program from the BIOS ROM 14. This command is first executed when the CPU 11 enters the SMM. By the execution of this command, control goes to the system management program.

The BIOS ROM 14 stores a BIOS (Basic I/O System) and comprises a flash memory to permit reprogramming. The BIOS is designed for the real mode. The BIOS includes an IRT routine executed at the system boot time, a device driver for controlling various I/O devices, and a system management program. The system management program is a program to be executed in the SMM. The system management program comprises an SMI program including an SMI process routine for controlling the CPU operation speed and the rotation of the motor fan 19, and an SMI handler for determining the SMI routine to be executed.

The SMI handler is a program in the BIOS, which is first accessed by the CPU 11 when the SMI has been generated. The SMI handler executes the checking of a factor of generation of the SMI and the access of the SMI routine associated with the factor of generation.

The RTC 15 is a clock module having its own operation battery and includes a CMOS memory constantly powered by this battery. The CMOS memory is used, for example, to store setup information indicating a system operation environment. The setup information represents two modes for cooling the CPU 11, i.e. a "Performance" mode and a "Quiet" mode. The user can designate one of the two modes.

In the "Performance" mode, the heat generation amount of the CPU 11 is decreased without degrading the performance of the CPU 11. In this mode, the motor fan 19 is rotated if the temperature of the CPU 11 exceeds a predetermined level.

In the "Quiet" mode, the heat generation amount of the CPU 11 is decreased without using the motor fan 19 which produces noise. In this mode, the operation speed of the CPU 11 is decreased if the temperature of the CPU 11 exceeds a predetermined level. This is effected by periodically setting the CPU 11 in the Stop Grant State and operating the CPU 11 intermittently.

The present system is provided with a hotkey function for switching these modes by a predetermined key input operation. The hotkey is a key for directly requesting the CPU 11 to switch the operation modes for setting/changing the system operation environment. Some specific keys on the keyboard are assigned to the hotkeys. If the hotkeys are operated, some functions of the CPU 11 for setting/changing the system operation environment are directly accessed and executed. In the hotkey process, unlike regular key data transmission, the SMI is issued to the CPU 11. Thereby, the CPU 11 is informed about the depression of the hotkeys. The hotkey technique using the SMI is disclosed, for example, in U.S. Ser. No. 08/106,724 (Filed: Aug. 16, 1993) filed by the applicant of the present application.

The power supply (PS) microcomputer 16 is a controller for controlling a power supply circuit to supply power to each unit in the system. The PS microcomputer 16 comprises a single-chip microcomputer. The PS microcomputer 16 manages the turn-on/off of a reset switch, the turn-on/off of a main power supply switch, the remaining capacity of a battery, the connection/disconnection of an AC adapter, and the turn-on/off of a display panel open/close detection switch. In addition, the PS microcomputer 16 monitors the temperature of the CPU 11 by making use of the temperature sensor 21. Upon detecting that the temperature of the CPU 11 has reached a predetermined level, the PS microcomputer 16 informs the CPU 11 about this fact by using the SMI.

In this case, the PS microcomputer 16 issues a command to the CPU 11 with use of the SMI in the following manner.

A plurality of monitor temperatures are preset in the PS microcomputer 16. If the temperature of the CPU 11 has reached any of the monitor temperatures, temperature data representing that temperature is set in a status register in the system controller II 18. Then, the PS microcomputer 16 sets an SMI generation flag in an SMI generation register in the system controller II (gate array)18. Thereby, the system controller II 18 generates the SMI (PS-SMI in this case) and the SMI is supplied to the CPU 11 via the system controller I 12.

The keyboard controller 17 controls a keyboard built in the computer body as standard equipment. The keyboard controller 17 scans a key matrix of the built-in keyboard, receives a signal associated with a depressed key, and converts the received signal to a predetermined key code (scan code). The keyboard controller 17 has two communication ports P1 and P2. The communication port P1 is connected to a system bus 1 and the communication port P2 is connected to the gate array 18.

A key code (e.g. Fn+F2 key) corresponding to the hotkey provided on the built-in keyboard is sent to the gate array 18 through the communication port P2 and set in a status register in the gate array 18. In this case, the SMI (HOTKEY SMI) is generated from the gate array 18 and thereby the CPU 11 is informed about the turn-on of the hotkey.

The key codes other than that of the hotkey are output to the system bus 1 via the communication port P1.

The motor fan 19 is a fan for cooling the CPU 11 and is situated such that the air passage thereof faces the CPU 11. The rotational speed of the motor fan 19 is varied by the drive controller 20.

The temperature sensor 21 detects the temperature of the CPU 11 and comprises, e.g. a thermistor. The temperature sensor 21 is situated on an LSI package of the CPU 11.

A description will now be given of hardware construction for controlling the generation of the SMI and STPCLK#.

The system controller I 12 comprises a clock generator 121 for supplying the external clock CLK to the CPU 11; an SMI generator 122 for supplying the SMI to the CPU 11; a stop clock controller 123 for controlling the generation of the STPCLK#; a stop clock interval timer 124 for controlling the interval of generation of the STPCLK#; a stop clock hold timer 125 for controlling a time period in which the CPU 11 is held in the Stop Grant State; and a register file 126 for making programmable the time-out count values of the timers 124 and 125.

In the present system, in order to decrease the operation speed of the CPU 11, a control operation is performed to alternately repeat the Stop Grant State and Normal State at predetermined time intervals. This control operation will now be described with reference to FIG. 3.

If a stop clock interval time is set in the register file 126, the stop clock interval timer 124 generates a time-out output at regular time intervals. In response to the time-out output, the stop clock controller 123 sets the STPCLK# in the active state. The stop clock hold timer 125 generates a time-out output after a hold time period set in the register file 126 has passed since the STPCLK# was set in the active state. In response to the time-out output, the stop clock controller 123 restores the STPCLK# to the inactive state.

If the STPCLK# is set in the active state, the CPU 11 executes the grant cycle and shifts from the Normal State to the Stop Grant State. The Stop Grant State is maintained until the STPCLK# is restored to the inactive state.

Thus, the operation state of the CPU 11 is alternately changed between the Stop Grant State and Normal State at predetermined time intervals, and the average operation speed is decreased. The degree of decrease in the operation speed is determined by the ratio of the stop clock interval time to the hold time.

The two cooling modes ("Performance" mode and "Quiet" mode) provided in the present system will now be described in detail with reference to FIGS. 4 to 6.

FIG. 4 shows an example of a setup screen used in the present system.

As shown in FIG. 4, the setup screen shows, as setting information items for defining the system operation environment, setting information relating to memories, setting information relating to a display, setting information relating to a hard disk, setting information relating to I/O ports, setting information relating to password registration, and other setting information (OTHERS). The setup screen is provided by, e.g. a setup routine in the ROM. The setup screen can be displayed by inputting a predetermined command through the keyboard. The portable computer can be set in an operation environment defined on the setup screen.

The information OTHERS on the setup screen includes a plurality of items for defining the setting condition of the battery save mode. In the present system, the battery save mode can be selected from three modes: a full power mode (Full Power), a low power mode (Low Power) and a user setting mode (User Setting).

(1) The full power mode is an operation mode for a high-performance operation. The contents of the environmental setting in the full power mode are presented to the user by window display, as shown in FIG. 5A. In the full power mode, the processing speed is set at "High", and the CPU sleep function, etc. are set at "Disable."

In addition, the full power mode, the cooling method is set at "Performance" mode.

(2) The low power mode is an operation mode for saving power consumption and extending a battery-powered operation time. The contents of the environmental setting in the low power mode are presented to the user by window display, as shown in FIG. 5B. In the low power mode, the processing speed is set at "Low", and the CPU sleep function, etc. are set at "Enable."

In addition, the low power mode, the cooling method is set at "Quiet" mode.

(3) The user setting mode is an operation mode for setting the operation environment according to each battery save option information item set by the user in the setup program. The operation condition for each item can be set on the window, as shown in FIG. 5C. In this case, the cooling method can be set to one of the "Performance" mode and "Quiet" mode.

FIG. 6 shows the relationship between the three battery save modes and the two cooling modes.

As is understood from FIG. 6, the battery save modes are associated with the cooling modes. In the full power mode which is often adopted when AC power is used, the "Performance" mode is used as cooling method, wherein the CPU operation speed is preferential. In the low power mode which is often adopted when battery power is used, the "Quiet" mode is used as cooling method, wherein the reduction in power consumption is preferential.

These three modes (full power mode, low power mode and user setting mode) may be sequentially switched by the aforementioned hotkey operation (Fn+F2), without using the setup screen (e.g. in the order of "full power mode", "low power mode" and "user setting mode").

The CPU cooling operations in the "Performance" mode and "Quiet" mode will now be described with reference to FIG. 7.

The CPU cooling operations are controlled at five boundary temperatures (Tpof, Tb2, Tb1, Ta2, Ta1). These boundary temperatures are set in the PS microcomputer 16 by an IRT (Initial Reliability Test) at the start-up of the system.

The temperature Tpof is a CPU temperature at which a forcible suspend request is issued. If it is detected that the CPU temperature has reached Tpof, a suspend process is automatically executed.

The temperatures Tb2 and Tb1 are boundary temperatures used in the "Quiet" mode. At Tb2, a CPU operation speed-down request is issued. At Tb1, a CPU operation speed-up request is issued.

The temperatures Ta2 and Ta1 are boundary temperatures used in the "Performance" mode. At Ta2, a motor fan turn-on request is issued. At Ta1, a motor fan turn-off request is issued.

In the "Quiet" mode, if the CPU temperature reaches Tb2, the CPU operation speed is lowered. If the CPU temperature falls to Tb1, the CPU operation speed is restored to the initial level.

In the "Performance" mode, if the CPU temperature reaches Ta2, the motor fan 19 is rotated. If the CPU temperature falls to Ta1, the motor fan 19 is stopped.

In the present embodiment, Ta1 is set at a lower level than Tb1. The reason will now be explained.

With use of the motor fan 19, the CPU temperature is lowered in a relatively short time period. Accordingly, if Ta1 is set at a higher level, the time period between the start of rotation of the motor fan 19 and the stop of rotation thereof is shorter and the time period between the stop of rotation of the motor fan 19 and the restart of rotation thereof due to the next overheat of the CPU 11 is also shorter. Consequently, the cycle of alternate rotation and stop of the motor fan 19 becomes shorter and unpleasant noise will be produced by the motor fan 19. Besides, since the motor fan 19 is situated such that its air passage faces the CPU 11, the CPU temperature is lowered in a relatively short time period, although the decrease in temperature of other parts is delayed. Thus, it is preferable to set at a lower level the motor fan turn-off temperature in the "Performance" mode in which the motor fan 19 is used.

On the other hand, in the "Quiet" mode in which the CPU operation speed is lowered, a relatively long time period is needed until the CPU temperature falls to Tb1. The longer this time period, the lower the computer performance. It is thus preferable to set Tb1 as high as possible in the "Quiet" mode in which the CPU operation speed is lowered.

As has been described above, the optimal environment of use can be realized by independently setting Tb1 and Ta1 in consideration of the characteristics of the two cooling functions: the rotation of the motor fan 19 and the reduction in CPU operation speed.

The PS microcomputer 16 does not recognize whether the current cooling method is the "Performance" mode or "Quiet" mode. Upon detecting that the CPU temperature has reached any of the boundary temperatures (Tpof, Tb2, Tb2, Ta2, Ta1), the PS microcomputer 16 issues one of (1) Ta2 level rise command, (2) Tb2 level rise command, (3) Ta1 level fall command, (4) Tb1 level fall command and (5) forcible suspend request command, by making use of the temperature data representing the present temperature and the SMI generation request flag. The issue of these commands is effected by setting flags, as shown in FIG. 15. Specifically, the flag of the Ta1 level fall command is set at bit 0 in the register 126 shown in FIG. 1. The flag of the Tb1 level fall command is set at bit 1. The flag of the Ta2 level rise command is set at bit 3. The flag of the Tb2 level rise command is set at bit 3. The flag of the forcible suspend request command (Tpof) is set at bit 4.

Figures 8, 9:
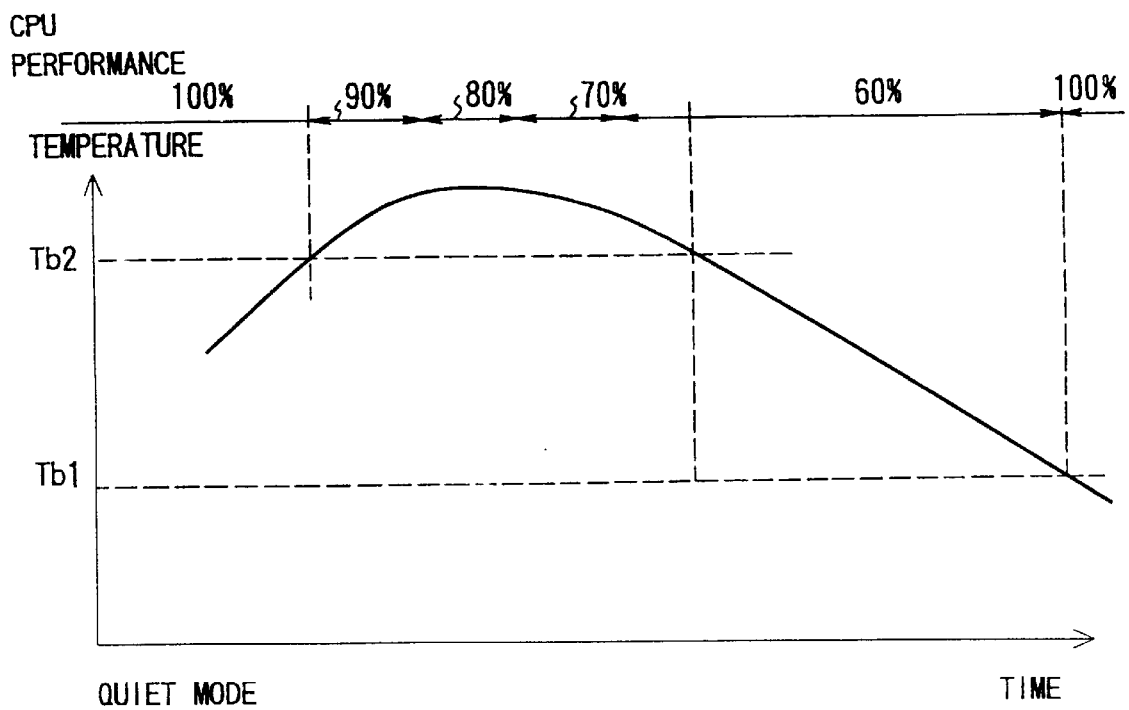
FIG. 8 illustrates a process of lowering the CPU performance in a stepwise manner in the system of this embodiment.
FIG. 9 illustrates the relationship between the CPU operation rate and register values in the system of the embodiment.

In response to each command (temperature data and SMI generation request flag) from the PS microcomputer 16, the SMI process routine is executed in the following manner.
(1) Ta2 Level Rise Command
    (In the Case of "Performance" Mode)
    If the temperature of CPU 11 exceeds Ta2, the Ta2 level rise command (temperature data representing ta2+SMI) is issued from the PS microcomputer 16. If this command is received in the SMI process routine of the BIOS, the motor fan 19 is driven. Then, until the CPU temperature falls to Ta2, the Ta2 level rise command is transmitted from the PS microcomputer 16 at regular time intervals (e.g. one-minute interval) but no processing is performed in the SMI process routine in response to the Ta2 level rise command. Specifically, as shown in FIG. 14, if the SMI is issued in step S21, the CPU 11 executes the SMI process routine. In step S23, the CPU 11 refers to the motor fan rotation flag and determines whether the motor fan 19 is already rotating. If the motor fan 19 is already rotating, steps S25 and S27 are skipped and the control goes to the other processing.
    If the motor fan 19 is not rotating, the motor fan 19 is rotated in step S25 and the motor fan rotation flag is set in step S27. Thus, the SMI process routine responds to the first Ta2 level rise command but does not to the following Ta2 level rise commands.
    (In the case of "Quiet" mode)
    If the temperature of the CPU 11 exceeds Ta2, the Ta2 level rise command (temperature data representing ta2+SMI) is issued from the PS microcomputer 16. Even if this command is received in the SMI process routine of the BIOS, no processing is performed.
(2) Tb2 Level Rise Command
    (In the Case of "Performances" Mode)
    If the temperature of CPU 11 exceeds Tb2, the Tb2 level rise command (temperature data representing tb2+SMI) is issued from the PS microcomputer 16. Even if this command is received in the SMI process routine of the BIOS, no processing is performed.
    (In the Case of "Quiet" Mode)
    If the temperature of CPU 11 exceeds Tb2, the Tb2 level rise command (temperature data representing tb2+SMI) is issued from the PS microcomputer 16. If this command is received in the SMI process routine of the BIOS, the performance of the CPU 11 is decreased to 90%. Then, until the CPU temperature falls to Tb2 or below, the Tb2 level rise command is transmitted from the PS microcomputer 16 at regular time intervals (e.g. one-minute interval). Each time the command is received, the performance of the CPU 11 is decreased by 10% in the SMI process routine. If the performance of the CPU 11 has decreased to 50%, the performance is maintained at this level.
    FIG. 8 illustrates a process of lowering the CPU performance in a stepwise manner in the system of this embodiment. In FIG. 8, after the temperature of CPU 11 exceeds Tb2, the performance of the CPU 11 is decreased in units of 10% to 90%, 80%, 70% and then 60%. At 60%, the CPU temperature has decreased to Tb2. Then, until the CPU temperature reaches Tb1, the CPU performance is maintained at 60%.
    The CPU performance is gradually decreased in this manner in order to avoid such a phenomenon unpleasant to the user from occurring, that the running speed of application software suddenly lowers. FIG. 9 shows the relationship between the CPU performance and the set values in the register 126.
    The CPU performance can be gradually decreased by varying the operation rate of CPU 11 (the ratio of stop clock hold time to stop clock interval timer time) on the basis of timer values in the register 126.
(3) Ta1 Level Fall Command
    (In the Case of "Performance" Mode)
    If the temperature of CPU 11 falls to Ta1, the Ta1 level fall command (temperature data representing Ta1+SMI) is issued from the PS microcomputer 16. If this command is received in the SMI process routine of the BIOS, the motor fan 19 is stopped.
    (In the Case of "Quiet" Mode)
    If the temperature of CPU 11 falls to Ta1, the Ta1 level fall command (temperature data representing Ta1+SMI) is issued from the PS microcomputer 16. Even if this command is received in the SMI process routine of the BIOS, no processing is performed.
(4) Tb1 Level Fall Command
    (In the Case of "Performance" Mode)
    If the temperature of CPU 11 falls to Tb1, the Tb1 level fall command (temperature data representing Tb1+SMI) is issued from the PS microcomputer 16. Even if this command is received in the SMI process routine of the BIOS, no processing is performed.
    (In the Case of "Quiet" Mode)
    If the temperature of CPU 11 falls to Tb1, the Tb1 level fall command (temperature data representing Tb1+SMI) is issued from the PS microcomputer 16. If this command is received in the SMI process routine of the BIOS, the performance of the CPU 11 is raised to 100%.
(5) Forcible Suspend Request Command
    If the temperature of the CPU 11 rises to Tpof, the forcible suspend request command (temperature data representing Tpof+SMI) is issued from the PS microcomputer 16. If this command is received in the SMI process routine of the BIOS, the suspend process is performed and power to the system is turned off, as in the case of the turn-off of the power supply switch.

Figure 10:
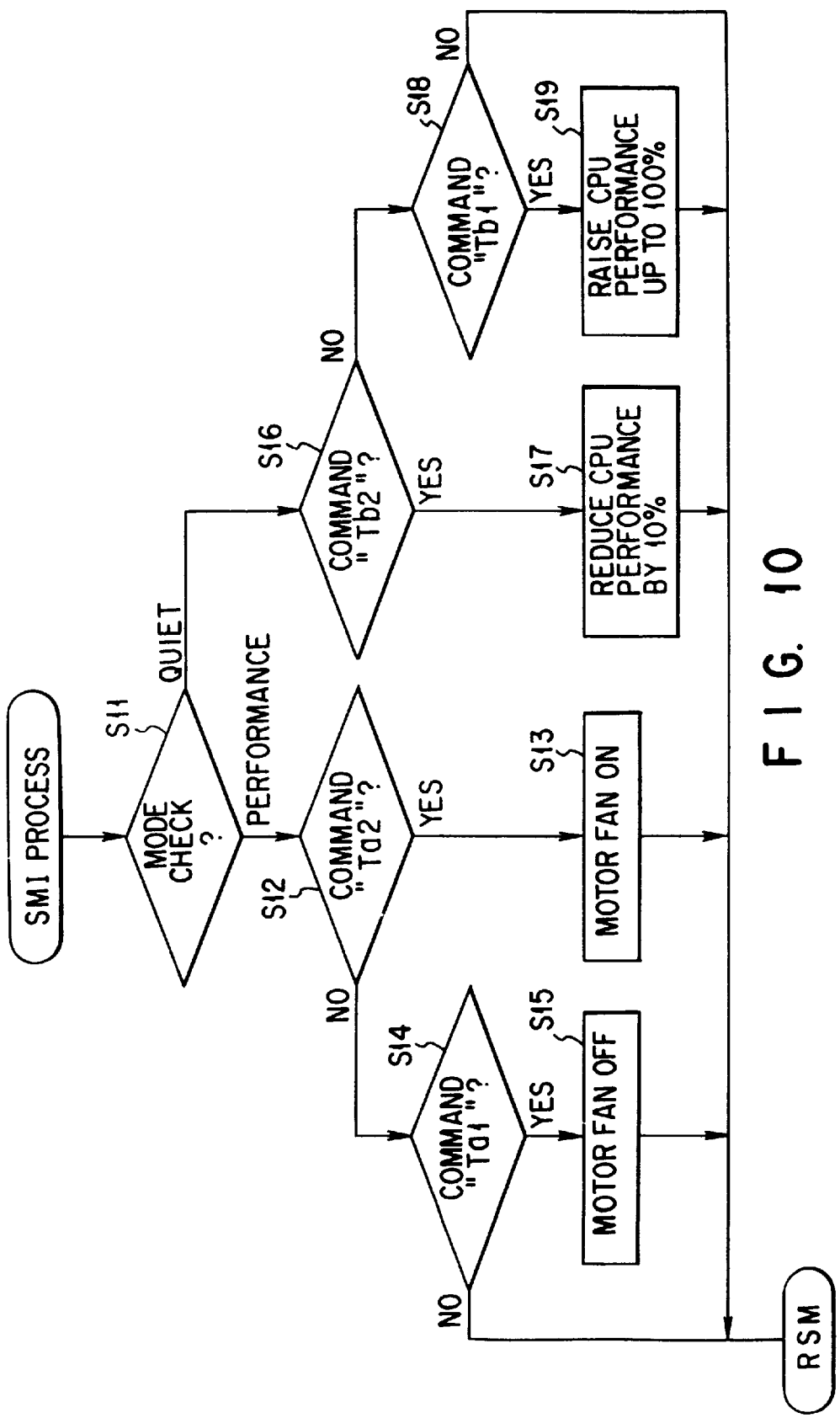
FIG. 10 is a flowchart for illustrating an operational procedure of an SMI process routine in the system of the embodiment.

The operational procedure of the SMI process routine will now be described with reference to the flowchart of FIG. 10.

The SMI process routine is activated by the command (Ta2 level rise command, Tb2 level rise command, Ta1 level fall command, or Tb1 level fall command) from the PS microcomputer 16. At first, the content of the CMOS memory is referred to, thereby determining whether the current cooling mode is the "Performance" mode or "Quiet" mode (step S11).

If the current cooling mode is the "Performance" mode, it is checked in the SMI process routine whether or not the received command is the Ta2 level rise command (step S12). If it is the Ta2 level rise command, the motor fan 19 is turned on (step S13) and then the RSM command is executed. Thus, control is returned to the program which was interrupted by the SMI. If the received command is not the Ta2 level rise command, it is determined in the SMI process routine whether or not the received command is the Ta1 level fall command (step S14). If it is the Ta1 level fall command, the motor fan 19 is turned off (step S15) and then the RSM command is executed. Thus, control is returned to the program which was interrupted by the SMI. If the received command is neither the Ta2 level rise command nor the Ta1 level fall command, the RSM command is immediately executed in the SMI process routine and control is returned to the program which was interrupted.

On the other hand, if the current cooling mode is the "Quiet" mode, it is determined in the SMI process routine whether or not the received command is the Tb2 level rise command (step S16). If it is the Tb2 level rise command, the CPU performance is reduced by 10% (step S17). Then, the RSM command is executed and control is returned to the interrupted program. If the received command is not the Tb2 level rise command, it is determined in the SMI process routine whether or not the received command is the Tb1 level fall command (step S18). If it is the Tb1 level fall command, the CPU performance is raised up to 100% (step S19). Then, the RSM command is executed and control is returned to the interrupted program. If the received command is neither the Tb2 level rise command nor the Tb1 level fall command, the RSM command is immediately executed in the SMI process routine and control is whether or not the received command is the Ta1 level fall command (step S14). If it is the Ta1 level fall command, the motor fan 19 is turned off (step S15) and then the RSM command is executed. Thus, control is returned to the program which was interrupted by the SMI. If the received command is neither the Ta2 level rise command nor the Ta1 level fall command, the RSM command is immediately executed in the SMI process routine and control is returned to the program which was interrupted.

On the other hand, if the current cooling mode is the "Quiet" mode, it is determined in the SMI process routine whether or not the received command is the Tb2 level rise command (step S16). If it is the Tb2 level rise command, the CPU performance is reduced by 10% (step S17). Then, the RSM command is executed and control is returned to the interrupted program. If the received command is not the Tb2 level rise command, it is determined in the SMI process routine whether or not the received command is the Tb1 level fall command (step S18). If it is the Tb1 level fall command, the CPU performance is raised up to 100% (step S19). Then, the RSM command is executed and control is returned to the interrupted program. If the received command is neither the Tb2 level rise command nor the Tb1 level fall command, the RSM command is immediately executed in the SMI process routine and control is returned to the program run before the generation of the SMI.

An example of a specific structure of the fan drive controller 20 will now be described with reference to FIG. 11.

In the preceding description, only the CPU operation speed is lowered in a stepwise manner and the rotational speed of the motor fan 19 is not controlled. However, the rotational speed of the fan 19 can be gradually increased by constructing the fan drive controller 20, as shown in FIG. 11.

Figure 11:
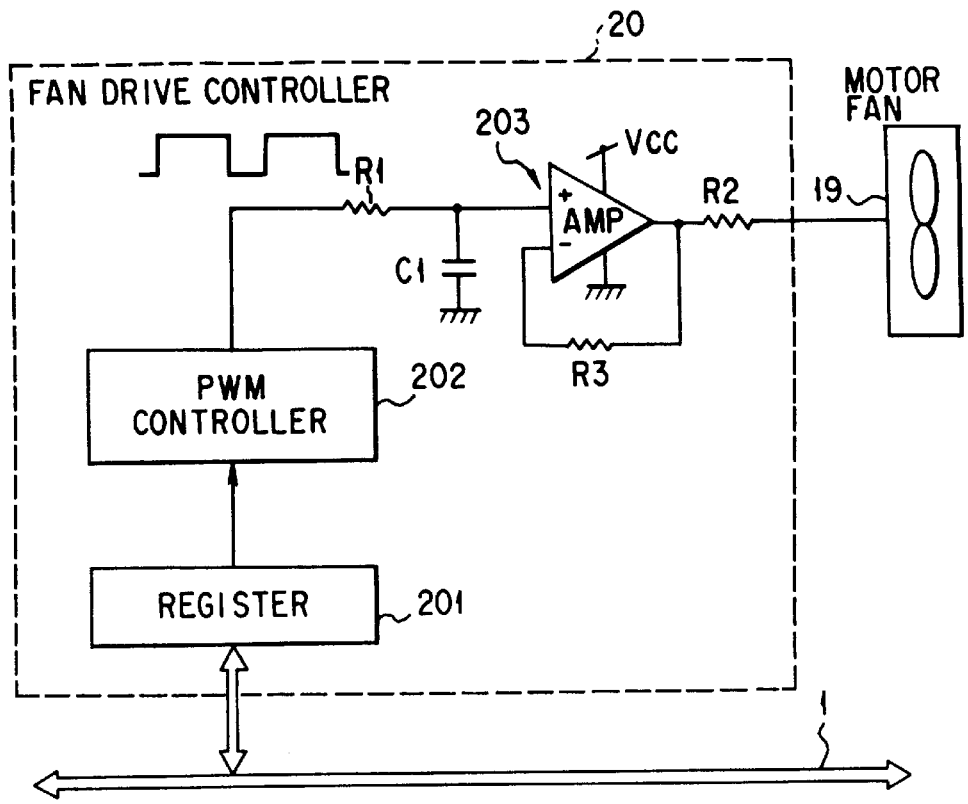
FIG. 11 is a circuit diagram showing an example of a specific structure of a fan drive controller provided in the system of the embodiment.

In FIG. 11, the fan drive controller 20 comprises a register 201, a PWM controller 202 and a driver 203. The PWM controller 202 generates a pulse signal having a pulse width designated by data set in the register 201. The pulse signal is smoothed by a resistor R1 and a capacitor C1 included in the driver 203 and converted to a DC voltage value corresponding to the pulse width. In accordance with this DC voltage value, a voltage value for driving the motor fan 19 is determined. Accordingly, the rotational speed of the motor fan 19 can be varied in accordance with the value of the pulse width data set in the register 201.

Thereby, the operation in the "Performance" mode in response to the Ta2 level rise command can be altered in the following manner.

When the temperature of the CPU 11 exceeds Ta2, the Ta2 level rise command (temperature data representing Ta2+ SMI) is issued from the PS microcomputer 16. If this command is received in the SMI process routine of the BIOS, the fan motor 19 is rotated at a rotational speed equal to 50% of the maximum speed. Then, until the CPU temperature falls to Ta2 or below, the Ta2 level rise command is transmitted from the PS microcomputer 16 at regular time intervals. Each time the command is received in the SMI process routine, the performance of the CPU 11 is increased by 10%. Thus, it is thus possible to avoid such an undesirable phenomenon from occurring, that noise is suddenly produced by the motor fan 19.

This stepwise control of the rotational speed of the fan and the CPU operation speed may be continuously performed from the reception of the associated level rise command to the reception of the level fall command.

An example of another control mode in the "Performance" mode will now be described with reference to FIG. 12.

In this control mode, the motor fan 19 is rotated at first, and if the CPU temperature is not sufficiently lowered, the CPU performance is then reduced.

Figure 12:
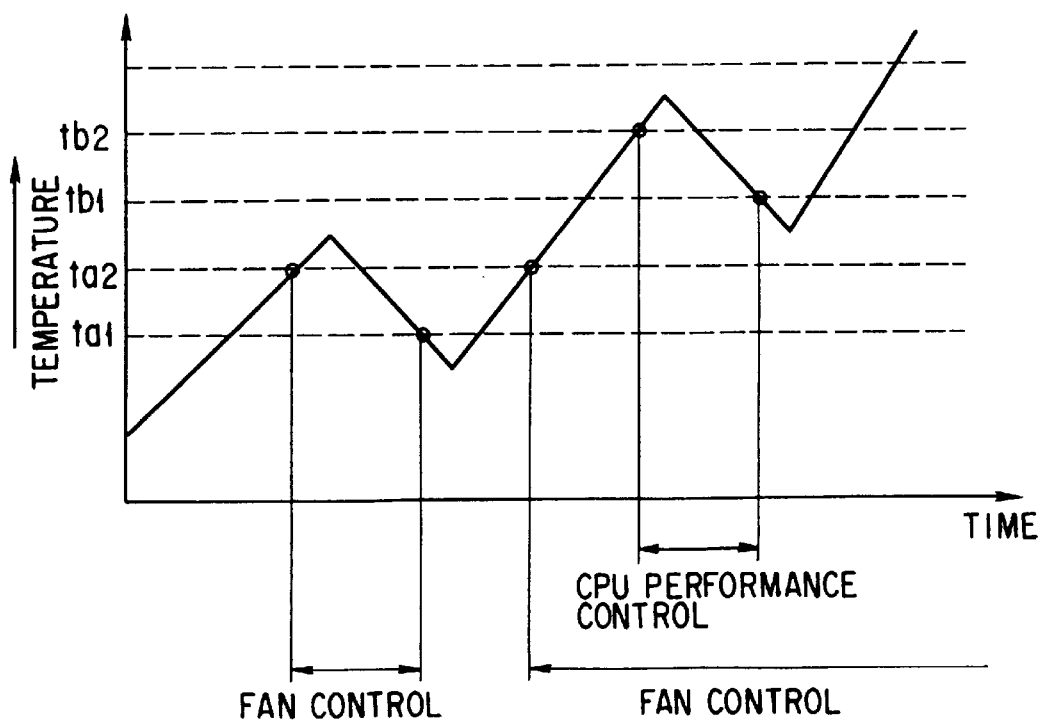
FIG. 12 is a graph showing a variation in temperature for explaining another example of the CPU cooling operation in the system of the embodiment.

Specifically, if the CPU temperature rises to Ta2 in FIG. 12, the motor fan 19 is rotated in the SMI process routine. If the CPU temperature lowers to Ta1 as a result, the rotation of the motor fan 19 is stopped. If the CPU temperature rises, despite the rotation of the fan, and reaches Tb2, the CPU performance is lowered in the SMI process routine. If the CPU temperature lowers to Tb1 as a result, the CPU performance is restored to the initial level.

In the "Quiet" mode, too, the reduction in CPU performance and the rotation of the fan may be combined. In this case, it is preferable that the CPU performance is reduced at first and if the CPU temperature is not sufficiently lowered, the motor fan is then rotated.

The combination of the reduction in CPU performance and the rotation of the fan can be freely chosen by the set values of boundary temperatures Ta1, Ta2, Tb1 and Tb2.

In the present embodiment, either the "Performance" mode or "Quiet" mode is determined, depending on whether the user sets the battery save mode at either the full power mode or the low power mode on the setup screen or by the hotkey. However, either the "Performance" mode or "Quiet" mode may be automatically selected by the IRT routine executed at the system start-up time. The operational procedure of the IRT routine in this case is illustrated in FIG. 13.

In the IRT routine, at first, the power supply status is obtained from the PS microcomputer 16, thereby to check whether the currently used main power supply is an external AC power supply or a battery, i.e. whether or not an AC adapter is connected (steps S21 and S22). If the AC adapter is connected, i.e. if the main power supply is the external AC power supply, data representing the "Performance" mode is written in the CMOS memory in the IRT routine, and the cooling mode is set at the "Performance" mode (step S23). On the other hand, if the AC adapter is not connected, i.e. if the main power supply is the battery, data representing the "Quiet" mode is written in the CMOS memory in the IRT routine, and the cooling mode is set at the "Quiet" mode (step S24). Thereby, the cooling method matching with the actual environment of use of the computer can be automatically set.

Needless to say, the automatically set cooling mode can be changed by using the setup screen or hotkey. Besides, instead of automatically setting the cooling mode, the battery save mode (full power/low power) may be automatically set, depending on whether the main power supply is an external AC power supply or a battery.

Furthermore, if the portable computer body is provided with a temperature sensor for sensing ambient temperature, the CPU performance in the "Quiet" mode can be set at a high level when the ambient temperature is high and can be set at a low level when the ambient temperature is low.

As has been described above, in the present embodiment, the two cooling functions, i.e. the reduction in operation speed of CPU 11 and the rotation of the motor fan 19, can be selectively used according to the cooling mode set by the user. Specifically, if the "Quiet" mode is set by the user, the battery operation time is not shortened in the low power consumption mode. In this case, the motor fan 19 is not rotated and only the CPU operation speed is lowered. On the other hand, if the "Performance" mode is selected by the user, the CPU performance is preferential. In this case, the CPU operation speed is not lowered, and only the motor fan 19 is rotated.

Accordingly, the optimal cooling function is adopted according to the computer operation environment set by the user. Overheat of the CPU 11 is effectively prevented without affecting the present environment of use.

In this embodiment, the STPCLK# function is used to lower the operation speed of the CPU 11. However, in the case of a CPU including no PLL and permitting dynamic variation of an external clock, the CPU operation speed may be controlled by varying the external clock frequency.

Further, in the above embodiment, the temperatures are set such that Ta1 is lower than Tb1 and Ta2 equals to Tb2. However, the present invention is not limited to these constraints. The temperatures Ta1, Tb1, Ta2, and Tb2 may be set optimally according to a system. The important thing is that Ta1, Ta2, Tb1, and Tb2 can be set arbitrarily depending on a system.

The present invention has been described by exemplifying a battery-driven portable computer. The present invention can also be applied to an AC-driven desktop computer.

What is claimed is:

1. A computer comprising:
    a CPU;
    means for controlling the operation speed of the CPU;
    motor fan for cooling the CPU;
    a power supply for supplying power to the CPU;
    power supply controller for determining whether the power supply is an AC power supply or a battery and informing the CPU of the result;
    means for automatically setting a first cooling mode for cooling the CPU by using the CPU speed control means when the power supply controller has determined that the power supply is the battery, and a second cooling mode for cooling the CPU by rotating the motor fan when the power supply controller has determined that the power supply is the AC power supply.

2. A computer comprising:
    a CPU;
    a power supply for supplying power to the CPU;
    means for controlling the operation of speed of the CPU;
    a motor fan for cooling the CPU;
    means for automatically setting a first cooling mode for lowering the speed of the CPU when said power supply is driven by a battery power supply, and a second cooling mode for rotating the motor fan when said power supply is driven by an AC power supply;
    means for cooling the CPU by using one of the CPU speed control means and the motor fan in accordance with the cooling mode set by said setting means; and
    means for changing the automatically-set cooling mode.

3. A computer, comprising:
    a device for producing heat in accordance with an operation thereof;
    a temperature sensor detecting a temperature of the device;
    device speed control means for controlling an operational speed of the device;
    a motor fan for cooling the device;
    means for turning on the motor fan in response to the detection of a predetermined cooling temperature by the temperature sensor;
    means for slowing the operational speed of the device while the motor fan is being turned on when the temperature of the device is not reduced to a predetermined value after the cooling operation by the motor fan; and
    means for shutting down the computer when the temperature sensor detects that the temperature continues to increase and reaches a predetermined critical temperature even after both cooling operations.

4. The computer according to claim 3, wherein the device is a CPU.

5. The computer according to claim 3, wherein the means for shutting down the computer executes a suspend process when the temperature of the device reaches the predetermined critical temperature.

6. The computer according to claim 5, wherein the device is a CPU.

7. The computer according to claim 3, wherein said means for shutting down the computer includes means for setting the computer in a suspend state.

8. A computer, comprising:
    a device for producing heat in accordance with an operation thereof;
    a temperature sensor detecting a temperature of the device;
    device speed control means for controlling an operational speed of the device;
    a motor fan for cooling the device;
    management means for slowing the operational speed of the device in response to the detection of a predetermined cooling start temperature by the temperature sensor, for thereafter turning on the motor fan while slowing the operational speed of the device when the temperature of the device does not reduce to a predetermined value by slowing the operational speed of the device, and for thereafter shutting down the computer when the temperature of the device continues to increase and reaches a predetermined critical value even after both cooling operations of slowing the operational speed and turning on the motor fan.

9. The computer according to claim 8, wherein the shutting down means executes a suspend process when the temperature of the device reaches the predetermined critical value.

10. The computer according to claim 8, wherein the device is a CPU.

11. A computer comprising:
a device for producing heat in accordance with an operation thereof;
a temperature sensor detecting a temperature of the device;
a motor fan for cooling the device;
means for setting a first cooling mode for activating the motor fan;
device cooling control means for cooling the device with the first cooling mode in response to a detection signal from the temperature sensor;
means for managing the device cooling control means when the first cooling mode is set by activating the motor fan when the device temperature reaches a first predetermined temperature and by deactivating the motor fan when the device temperature reaches a second predetermined temperature which is lower than the first predetermined temperature.

12. The computer according to claim 11, wherein the device is a CPU.

13. The computer according to claim 11, further comprising device speed control means for controlling an operational speed of the device.

14. The computer according to claim 11, wherein the setting means further sets a second cooling mode for reducing the operational speed of the device; and
the device cooling control means cools the device with the first or second cooling mode in response to the detection signal from the temperature sensor.

15. A computer comprising:
a device for producing heat in accordance with operation thereof;
a temperature sensor for detecting a temperature of the device;
means for throttling the device to slowdown its operation and generation of heat;
management means for controlling the throttling means to slow down its operation of the device to cool the device when the detected temperature exceeds a first predetermined threshold value and to slow down its operation in a stepwise manner until the detected temperature reaches a second threshold value lower than the first threshold value.

16. The computer according to claim 15, wherein the device is a CPU.

17. The computer according to claim 15, further comprising temperature sensing means for detecting an ambient temperature, and wherein the management means sets the operational speed of the device low when the ambient temperature is high and sets the operational speed of the device high when the ambient temperature is low.

18. A computer comprising:
a device for producing heat in accordance with an operation thereof;
a temperature sensor detecting a temperature of the device;
hardware means for cooling the device; and
management means for executing a shutdown process for the computer when a temperature detected by the temperature sensor reaches a critical value and for disabling power to the computer after a predetermined time has elapsed in order to execute the shutdown process normally.

19. The computer according to claim 18, wherein the management means suspends operation of the device when a temperature detected by the temperature sensor reaches a predetermined critical value and after a predetermined time has elapsed.

20. The computer according to claim 18, wherein the device is a CPU.

21. A portable computer comprising:
a device for producing heat in accordance with an operation thereof;
a motor fan cooling the device;
means for managing a first cooling mode in which a cooling operation of the device is performed by using the motor fan and a second cooling mode in which a cooling operation of the device is performed by slowing the operation of the device and using the motor fan, the managing means designating one of the first and second cooling modes; and
wherein the computer is provided with a plurality of user settable power modes and the managing means designates the cooling mode in accordance with the set power mode.

22. The computer according to claim 21, wherein the computer is a battery-driven portable computer, wherein the user settable power modes have a full-power mode, a low-power mode and a user mode, and wherein the managing means sets the first mode when the full-power mode is selected, the second mode when the low-power mode is selected and sets any one of the first mode and the second mode when the user mode is selected.

23. The computer according to claim 21, wherein the device is a CPU and the managing means cools the CPU in the first mode by turning on the motor fan in response to a temperature detected by the temperature sensor.

24. A computer comprising:
a CPU having a normal state in which an instruction is executed and a state in which an internal clock of the CPU is stopped, and for producing heat in accordance with an operation thereof;
a temperature sensor detecting a temperature of the CPU; and
means for managing a first mode in which a cooling operation of the CPU is performed by using a motor fan and a second mode in which a cooling operation of the CPU is performed by cyclically setting the CPU in the state in which the internal clock of the CPU is stopped in response to a temperature detected by the temperature sensor, the managing means including designating means for switching between the first mode and the second mode.

25. The computer according to claim 24, wherein the computer is a battery-driven portable computer, wherein the battery has a full-power mode, a low-power mode and a user mode, and wherein the managing means sets the first mode when the full-power mode is selected, the second mode when the low-power mode is selected and sets any one of the first mode and the second mode when the user mode is selected.

26. A computer system comprising:

a device for producing heat in accordance with an operation thereof;

a temperature sensor detecting a temperature of the device;

device speed control means for controlling an operational speed of the device;

means for setting a first cooling mode for reducing the operational speed of the device by using the device speed control means;

device cooling control means for cooling the device with the first cooling mode in response to a detection signal from the temperature sensor;

means for managing the device cooling control means when the first cooling mode is set by activating the device speed control means when the device temperature reaches a first predetermined temperature and by deactivating the device speed control means when the device temperature reaches a second predetermined temperature lower than the first predetermined temperature.

27. A computer comprising:

a device for producing heat in accordance with an operation thereof;

a temperature sensor detecting a temperature of the device;

table means for storing reference value data indicating cooling temperature of the device;

cooling control means for cooling the device in accordance with the reference value data stored in the table means and the temperature of the device detected by the temperature sensor; and means for dynamically changing the reference value data stored in the table means when the detected temperature reaches the reference value data.

28. The computer according to claim 27, further comprising a plurality of cooling modes for cooling the device and wherein the reference value data stored in the table means is selected in accordance with the cooling mode.

29. The computer according to claim 27, wherein the table means stores:

first data indicating that the cooling temperature exceeds a first temperature at which a device-operation-speed increasing request is issued; and second data indicating that the cooling temperature exceeds a second temperature at which a device-operation-speed decreasing request is issued.

30. The computer according to claim 29, wherein the table means further includes:

third data indicating that the cooling temperature exceeds a temperature at which a fan-on request is issued; and fourth data indicating that the cooling temperature exceeds a temperature at which a fan-off request is issued.

31. The computer according to claim 29, wherein the table means further includes fifth data indicating that the cooling temperature exceeds a temperature at which a shutdown process is executed.

* * * * *